March 10, 1936.  H. A. McFARLAND  2,033,842
MANUALLY CONTROLLED AUTOMATIC BALANCING REGULATOR
Filed Feb. 25, 1935
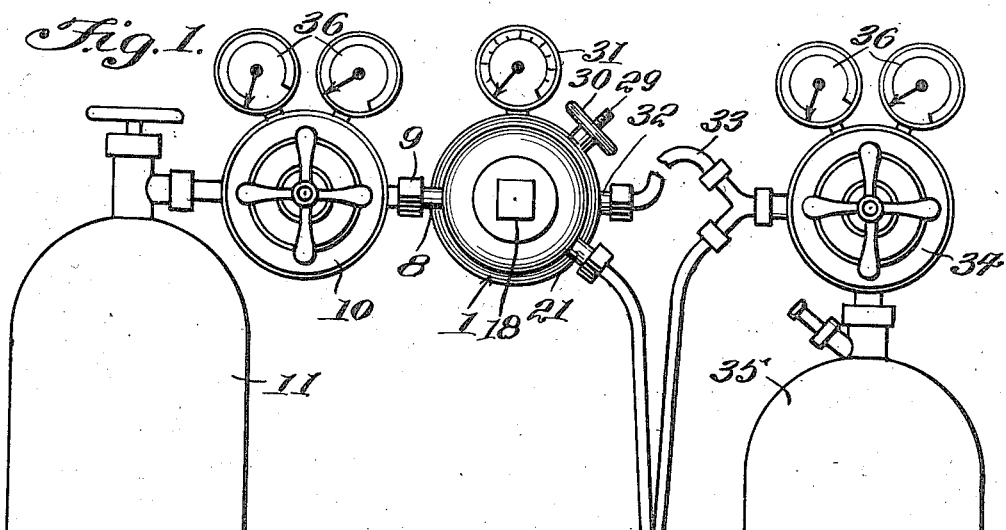
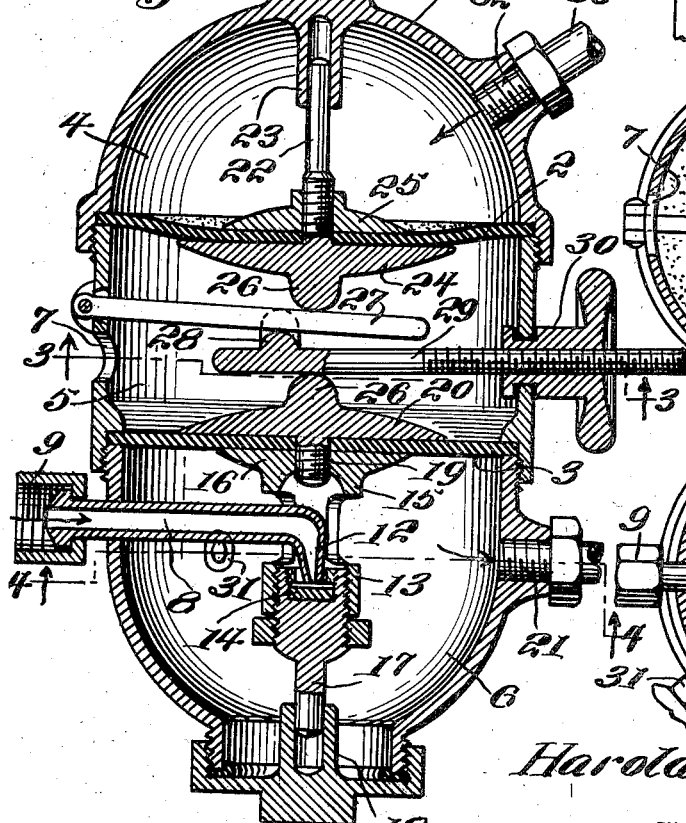
Harold A. McFarland
INVENTOR
BY Victor J. Evans & Co.
ATTORNEY
WITNESS: J. T. L. Wright

UNITED STATES PATENT OFFICE 2,033,842

MANUALLY CONTROLLED AUTOMATIC BALANCING REGULATOR

Harold A. McFarland, Casper, Wyo., assignor of one-half to Nels C. Petersen, Casper, Wyo.

Application February 25, 1935, Serial No. 8,126

1 Claim. (Cl. 137—153)

This invention relates to a regulator especially adapted for use in connection with the conventional type of oxygen and acetylene regulators of oxy-acetylene welding and cutting outfits and has for the primary object the provision of a device of this character which will provide a balanced mixture of oxygen and acetylene of a working pressure at the outlet or blow pipe of the oxy-acetylene welding and cutting outfit and which working pressure will be free of fluctuation.

Another object of this invention is the provision of means whereby the working pressure of the oxygen and acetylene mixture may be manually varied with accuracy.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating an oxy-acetylene welding and cutting outfit equipped with a regulator constructed in accordance with my invention.

Figure 2 is a vertical sectional view illustrating the regulator.

Figure 3 is a sectional view taken on the line 3—3 of Figure 2.

Figure 4 is a sectional view taken on the line 4—4 of Figure 2.

Referring in detail to the drawing, the numeral 1 indicates a sectional casing wherein the sections are detachably connected by screw threads. The casing is composed of end and intermediate sections and between these sections are mounted spaced diaphragms 2 and 3 dividing the casing 1 into an acetylene chamber 4, an atmospheric pressure chamber 5 and an oxygen chamber 6. Atmospheric pressure is admitted to the chamber 5 by a port 7.

An intake oxygen pipe 8 is mounted in the oxygen chamber 6 and extends exteriorly thereof and is equipped with a fitting 9 to permit the pipe 8 to be readily connected and disconnected to an oxygen regulator 10 of a conventional type and which is connected to an oxygen supply tank 11, as shown in Figure 1. The inner end of the pipe 8 is angularly disposed and reduced to form a nozzle 12 operating in a valve cage 13, the latter being so mounted that it is capable of moving relative to the nozzle 12 and includes a removably mounted valve element 14 preferably in the form of a disc constructed of some suitable yieldable material and a slotted body 15 having at one end an enlargement 16 and at the opposite end an extension 17 operating in a guide 18 carried by the casing 1. The enlargement 16 is arranged in abutting engagement with the diaphragm 3 and provided with a screw threaded opening to receive a screw threaded extension 19 formed on a head 20 arranged in abutting engagement with the diaphragm 3 and cooperates with the enlargement 16 in securing the body 15 and the valve cage 13 to the diaphragm. The slot in the body 15 of the valve cage 13 permits the pipe 8 and its nozzle 12 to extend into the body with the latter capable of moving relative to the nozzle. An outlet fitting 21 is carried by the casing 1 in communication with the oxygen chamber 6 and is adapted to be connected to one of the pipes and conduits leading to the outlet or blow pipe (not shown) of the oxy-acetylene welding and cutting outfit.

A stem 22 operates in the acetylene chamber 4 and has one end disposed in a guide 23 forming an integral part of the casing 1 while its opposite end is externally screw threaded and is formed integrally with a head 24 which abuts one face of the diaphragm 2. The stem 22 or the screw threaded portion thereof extends through an opening in the diaphragm 2 and said screw threaded portion has threaded thereto a plate 25 cooperating with the head 24 in securing the stem to the diaphragm 2.

The heads 20 and 24 have formed integrally therewith and centrally thereof projection or bearing portions 26 arranged opposite to one another within the atmospheric pressure chamber 5. An arm 27 has one end pivoted to the casing and operates in the atmospheric chamber 5 and contacts with the bearing portion 26 of the head 24 and is engaged by a cam 28 formed on an adjusting rod 29. The adjusting rod engages the bearing portion 26 of the head 20 and is threaded to a combined bushing and finger piece 30 arranged exteriorly of the casing and is rotatably connected to said casing with a limited swinging movement relative thereto. The combined bushing and finger piece 30 is for the purpose of adjusting the rod 29 inwardly and outwardly of the casing so as to vary the location of the cam 28 on the arm 27. The rod 29 and the arm 27 provide a manual medium for affecting the ratio of pressure between the chambers 4 and 6 and permits the pressure of the acetylene and oxygen to be varied so as to meet with different requirements of operation of the oxy-acetylene welding and cutting outfit.

A gage 31 is connected with the oxygen chamber 6 and the acetylene chamber 4 has a fitting 32 for connection with a pipe 33 which is in turn connected directly to the output of the conventional acetylene regulator 34, as shown in Figure 1. The output of the regulator 34 is also connected to the blow torch of the outfit and the inlet of the regulator is connected in the usual manner to the acetylene supply tank 35. The regulators 10 and 34 of the conventional outfit have the usual gages 36.

In operation, my invention is assembled to the oxy-acetylene welding and cutting outfit, as shown in Figure 1, and the regulators 10 and 34 are adjusted to permit the oxy-acetylene to escape from the tanks 11 and 35 at a pressure slightly higher than needed at the blow pipe (not shown) of the outfit. The acetylene chamber 4 of my invention due to its connection with the regulator 34 comes under said pressure of acetylene and the oxygen chamber 6 under said pressure of oxygen from the regulator 10. The rod 29 is adjusted for a proper working pressure at the blow torch and should the oxygen pressure in the oxygen chamber 6 build up it will flex the diaphragm 3 and move the valve cage upwardly to bring the valve 14 in engagement with the nozzle 12 and interrupt the incoming oxygen from the regulator 10. As the oxygen is consumed by the blow torch from the oxygen chamber 6, the pressure of the acetylene in the chamber 4 overcomes the pressure in the oxygen chamber 6 and due to the connection between the diaphragms the valve cage 13 is moved to disengage the valve 14 from the nozzle 12 and again admit oxygen under pressure from the regulator 10. It will, therefore, be seen that this invention will produce a balanced mixture of acetylene and oxygen at the blow torch of the outfit and at a proper working pressure free of fluctuation and further it will be noted that through the adjustment of the rod 29 the working pressure of the combined acetylene and oxygen may be accurately varied to meet with different working requirements. Heretofore outfits of the conventional character employing simply the regulators 10 and 34 have been hard or difficult to adjust with any appreciable accuracy and the pressure of the oxygen and acetylene fluctuates at the blow torch causing defective welding and injury to the material being welded. By the employment of my invention in connection with the regulators 10 and 34 these objections are eliminated permitting efficient welding free of danger of injury to the material to be carried out.

Due to different makes of blow pipes used with outfits of the character described require different pressures of oxygen and acetylene to give a proper flame and in order that my invention will properly proportion the acetylene and oxygen the adjustable connection between the diaphragms is provided so that the ratio of pressure between the chambers 4 and 6 can be varied to meet with the different requirements caused by different types of blow torches.

Having described the invention, I claim:

A regulator comprising a casing, spaced diaphragms in said casing dividing the latter into acetylene, oxygen and atmospheric pressure chambers, an oxygen nozzle extending into the oxygen chamber, a valve cage carried by one of the diaphragms and located in the oxygen chamber, a valve located in the valve cage for opening and closing the nozzle in accordance with the movement of said last diaphragm by the pressure of oxygen in the oxygen chamber, means for connecting the acetylene chamber to an acetylene supply, an arm pivoted at one end to the casing and located in the atmospheric pressure chamber and arranged between said diaphragms, a slidable adjusting rod extending into the atmospheric pressure chamber and extending in an opposite direction to the arm, a cam on said rod and slidably engaging said arm and is adjustable endwise of the latter by the sliding movement of the rod, means carried by one of the diaphragms to engage the arm, means carried by the other diaphragm to engage with the rod whereby the movement of one diaphragm will impart a corresponding movement to the other diaphragm, and means rotatably connected to the casing and threaded to the rod for imparting endwise movement to the latter by the rotation of said last means.

HAROLD A. McFARLAND.